Patented Sept. 29, 1925.

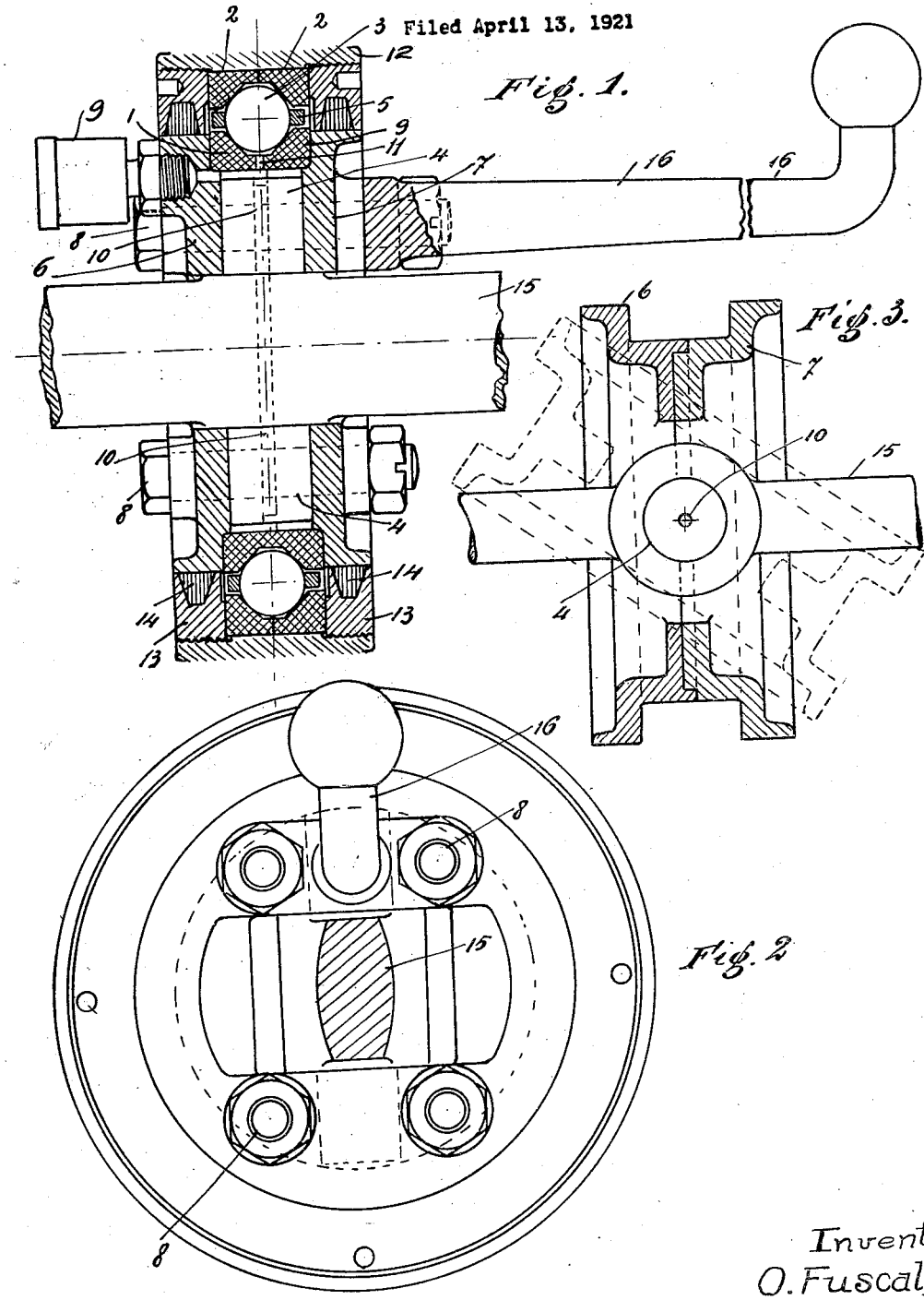

1,555,240

UNITED STATES PATENT OFFICE.

OTTAVIO FUSCALDO, OF BRESCIA, ITALY.

VEHICLE WHEEL WITH CENTRAL SWIVELING.

Application filed April 13, 1921. Serial No. 461,091.

*To all whom it may concern:*

Be it known that I, OTTAVIO FUSCALDO, gentleman, residing at 4, Via Mario Alberto, Brescia, in the Kingdom of Italy, have invented new and useful Improvements in Vehicle Wheels with Central Swiveling, of which the following is a specification.

The wheel constructed according to the present invention is equally adapted for two-four-and more wheeled vehicles of any type and more especially for vehicles with four wheels arranged at the vertices of a rhombus, it being sufficient to this effect to so shape the wheel axles, that according to the cases it extends past the wheel on both sides or enter the wheel on one side only and terminate midway of the wheel thickness.

The invention particularly relates to a special ball bearing having the property that it can take up the stresses and thrusts no matter what may be their direction and that it can be readily adjusted to compensate for the wear of the balls and rings. If required, the balls may be replaced and the outer rings brought nearer to each other, a small portion of the thickness of the said rings being taken off their adjacent surfaces.

The invention is illustrated in one of its execution forms in the annexed drawing in which:

Fig. 1 is an axial section through the wheel hub;

Fig. 2 is an outside view from the front;

Fig. 3 is a section through the hub box;

Referring to the drawings in detail, the ball bearing comprises an inner ring 1 and a pair of outer rings 2 enclosing a row of balls 3 within their four inclined contacting and working surfaces. The ball bearing is so dimensioned that the pivots 4 can be lodged therein and is arranged in such a position that the axis of the said pivots lies in the common plane of the ball centres.

5 is a cage of any desired type, keeping the balls apart from each other as is used with all ball bearings of the trade.

The inner ball bearing ring 1 is enclosed together with the pivots 4 by two halves 6 and 7 held together by bolts 8 so that the ring 1 is locked while the pivots 4 are free to revolve. A lubricator 9 conveys the lubricant above the pivot 4 and through the duct 10, under the pivot 4, from whence the lubricant gets into the ball chamber through the opening 11. The center box 6—7 has an empty space on each side permitting the box to take a markedly inclined position in any direction relatively to the axle, as may be seen in Fig. 3. To the box 6—7 are secured in any convenient manner the steering levers; in Figs. 1 and 2 the steering lever 16 is shown as secured to the box by means of a flange and bolt attachment, the bolts being the same that serve to hold the two box halves together.

The outer rings 2 of the ball bearing are locked in the wheel hub, a portion of which latter is indicated at 12 in Figure 1, and at the same time are firmly held against each other by means of the two screw-threaded ferrules 13; the felt washers 14 prevent the lubricant from getting out and the dust or other foreign matter from getting inside of the bearing. The wheel hub 12 on which the bearing is screwed may be of different form according to the type of wheel to which it must be fitted.

Having now described my invention and how the same is to be carried out, what I claim as my invention is:

In a wheel structure, an axle carried pivot pin, a supporting member mounted to turn about the pivot pin, a wheel hub, and a single circular series of friction reducing members interposed between the supporting member and wheel hub, said supporting member consisting of two parts and the line of division of said parts lying substantially in the plane of the axes of said pivot pin and said circular series of friction reducing members.

In testimony whereof I affix my signature.

OTTAVIO FUSCALDO.